(12) United States Patent
Huth et al.

(10) Patent No.: US 11,822,463 B2
(45) Date of Patent: *Nov. 21, 2023

(54) COMPUTER-IMPLEMENTED METHOD AND DEVICE FOR SELECTING A FUZZING METHOD FOR TESTING A PROGRAM CODE

(71) Applicant: Robert Bosch GmbH, Stuttgart (DE)

(72) Inventors: Christopher Huth, Weil der Stadt (DE); Anupam Sarkar, Kolkata (IN); Simon Greiner, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 157 days.

This patent is subject to a terminal disclaimer.

(21) Appl. No.: 17/453,067

(22) Filed: Nov. 1, 2021

(65) Prior Publication Data

US 2022/0138092 A1     May 5, 2022

(30) Foreign Application Priority Data

Nov. 4, 2020 (DE) ...................... 10 2020 213 891.5

(51) Int. Cl.
*G06F 9/44*     (2018.01)
*G06F 11/36*     (2006.01)
*G06N 5/048*     (2023.01)

(52) U.S. Cl.
CPC ...... *G06F 11/3688* (2013.01); *G06F 11/3684* (2013.01); *G06F 11/3692* (2013.01); *G06N 5/048* (2013.01)

(58) Field of Classification Search
None
See application file for complete search history.

(56) References Cited

U.S. PATENT DOCUMENTS

| | | | |
|---|---|---|---|
| 2012/0089868 A1* | 4/2012 | Meijer | G06F 11/3684 714/E11.212 |
| 2013/0212435 A1* | 8/2013 | Qiu | G06F 11/3688 714/E11.178 |
| 2021/0026758 A1* | 1/2021 | Davis | G06F 11/3688 |
| 2021/0141715 A1* | 5/2021 | Lin | G06F 11/3688 |
| 2021/0216435 A1* | 7/2021 | Godefroid | G06F 11/3684 |
| 2021/0240601 A1* | 8/2021 | Calvano | G06F 11/3688 |
| 2022/0019926 A1* | 1/2022 | Yun | G06F 11/3688 |

\* cited by examiner

*Primary Examiner* — Qamrun Nahar
(74) *Attorney, Agent, or Firm* — NORTON ROSE FULBRIGHT US LLP; Gerard Messina

(57) ABSTRACT

A computer-implemented method for selecting a fuzzing method for carrying out fuzzing testing of a predefined program code. The method includes: providing one or multiple reference performance metrics that characterize the result of reference fuzzing testing of the program code to be tested, using a reference fuzzing method; carrying out fuzzing tests, based on various fuzzing methods, on the predefined program code in order to ascertain one or multiple performance metrics in each case; selecting one or multiple fuzzing methods corresponding to the associated performance metrics, as a function of the reference performance metric; and carrying out fuzzing testing corresponding to the one or multiple selected fuzzing methods.

8 Claims, 1 Drawing Sheet

COMPUTER-IMPLEMENTED METHOD AND DEVICE FOR SELECTING A FUZZING METHOD FOR TESTING A PROGRAM CODE

FIELD

The present invention relates to a method for testing a program code via so-called fuzzing testing. The present invention relates in particular to measures for selecting a fuzzing method for fuzzing testing of a certain program code.

BACKGROUND INFORMATION

A conventional method for detecting errors in a program code which is executed on a computer system and which may be implemented in software or hardware is to examine the program code for program execution errors or system crashes with the aid of a fuzzing test method. In the process, the so-called fuzzing inputs are generated for the computer system, a program code to be tested is executed using the inputs, and the functioning of the algorithm of the program code is supervised. The supervision of the execution of the program code includes establishing whether the running of the algorithm results in a program execution error such as a system crash or unexpected execution stop.

During the execution of the program, the internal behavior of the program sequence is supervised, in particular with regard to the sequence paths carried out by the program code. This procedure is repeated using different inputs in order to obtain a piece of information concerning the behavior of the program code for a wide range of inputs. The objective of the program code supervision is to generate the inputs in such a way that the greatest possible coverage of the program sequence paths is achieved, i.e., the greatest possible number of program sequence paths is run through during the repeated variation of the inputs.

If an error or an unexpected behavior occurs during an execution of a program code, this is recognized by the fuzzing tool and signaled via appropriate information that indicates which fuzzing input has resulted in the error.

SUMMARY

According to the present invention, a computer-implemented method for selecting a fuzzing method for carrying out a fuzzing test, a method for training a data-based fuzzing selection model for selecting a fuzzing method, and corresponding devices are provided.

Further embodiments of the present invention are disclosed herein.

According to a first aspect of the present invention, a computer-implemented method for selecting a fuzzing method for carrying out fuzzing testing of a predefined program code is provided, including the following steps:
  providing one or multiple reference performance metrics that characterize the result of reference fuzzing testing of the program code to be tested, using a reference fuzzing method;
  carrying out fuzzing tests, based on various fuzzing methods, on the predefined program code in order to ascertain one or multiple performance metrics in each case;
  selecting one or multiple fuzzing methods corresponding to the associated performance metrics, as a function of the reference performance metric; and
  carrying out fuzzing testing corresponding to the one or multiple selected fuzzing methods.

Numerous fuzzing methods are available, which may be subdivided essentially into the classes of source code fuzzing and protocol fuzzing. The source code fuzzing is used to find errors in a program code, an attempt being made to test the greatest possible number of program sequence paths in the program code with regard to an undesirable program sequence. For protocol fuzzing, the communication of a program code is supervised by delaying, intercepting, or manipulating communication messages in order to trigger an undesirable system behavior. The fuzzing software is used as a "man-in-the-middle" unit between two subunits of the system to be tested.

For the source code fuzzing, several fuzzing methods are presently available that are implemented in various fuzzing software tools. Examples of such fuzzing software tools are American Fuzzy Lop, libFuzzer, or honggfuzz.

In addition, the fuzzing methods may start with various seed data as inputs, which significantly influence the course of the fuzzing test. The fuzzing testing is based to a large extent on randomness, so that the selected seed file as well as the random selections make it difficult to compare fuzzing methods during the testing.

Therefore, the same seed data are to be used for comparing the fuzzing software tools.

A seed file represents a minimum set of valid inputs. Programs that are based on the same inputs should have the same seed data. This applies in particular for media formats such as PNG, JPG, PDAF, AVI, MP3, GIF, but also for other data structures such as PDF, ELF, XML, SQL, and the like.

In addition, the fuzzing software tools are intended to use the same dictionaries for the same input type of the seed data used. A dictionary includes a default set for certain inputs such as fault injection patterns and the like, and in particular contains entries in the form of characters, symbols, words, binary character strings, or the like, which typically are an integral part of the input value for the software to be tested. There are also general dictionaries, for example for PDF, ELF, XML, or SQL parsers, as well as individual dictionaries for only one type of software. Dictionaries are used to aid the fuzzer in generating inputs, which result in a longer execution path in the software to be tested.

A fuzzing method may be characterized in each case by the fuzzing software tool used, and in particular the seed data used and/or the dictionary used, and/or one or multiple of the following fuzzing test parameters or fuzzing tool configurations: a limitation of the available memory, a setting of a time-out for each test case, a mode or a selection of heuristics of the fuzzing tool, a use of a grammar, a testing period of the fuzzing test, and at least one property of a data processing platform on which the fuzzing software tool is operated, as well as the configuration thereof.

One feature of the above method in accordance with an example embodiment of the present invention is to compare the results of one or multiple fuzzing tests, which are based on different fuzzing methods, to a reference fuzzing test of a certain predefined fuzzing method, and to make a selection of one or multiple of the different fuzzing methods as a function of the performance metric resulting from the fuzzing method, and of the reference performance metric of the reference fuzzing test resulting from the reference fuzzing method.

The performance metric may characterize the program code based on statistical features, and in particular may include or be a function of one or multiple of the following variables:

an assessment of the program output;

an assessment of the behavior during a program abortion, such as a segmentation fault, use-after-free, buffer overflow, etc.;

an assessment of a decision history, including an assessment of the program sequence paths that are run through, an assessment of the sequence of the branching decisions, an assessment of the control flow, and the like, in order to indicate how well a fuzzing method covers a program code;

an assessment of the test coverage with regard to program lines, program functions, and program sequence paths, in particular a functional coverage, the number of executed program sequence paths, the number of different errors that are found, and the average fuzzing execution time;

an assessment of the test costs, including an execution time or the number of instructions, a memory utilization (with regard to size or memory location), a measure of a register utilization;

a patch distance, encompassing the distance between two software code versions (two patch versions), a patch corresponding to a region in the program code that has been updated, so that the fuzzing testing attempts to reach this new program position.

In addition, one or multiple performance metric differences between the one or multiple reference performance metrics and the one or multiple performance metrics of the fuzzing test methods may be determined, that/those fuzzing method(s) being selected for which a performance metric difference, and/or a measure that results from the performance metric differences according to an assessment function, are/is at a maximum or minimum.

The fuzzing tests may be carried out on the predefined program code, based on various fuzzing methods, for ascertaining the performance metrics, each with an execution duration, in particular between 1 minute and 3 hours, and/or a computing time that is less than the execution duration of the conventional fuzzing testing (execution duration of one to several days, for example), using the selected fuzzing method(s).

The program code may correspond to a function of a provided program code that is separated by a test wrapper.

According to a further aspect of the present invention, a device for selecting a fuzzing method for carrying out fuzzing testing of a predefined program code is provided, the device being designed to:

provide one or multiple reference performance metrics that characterize the result of reference fuzzing testing of the program code to be tested, using a predefined reference fuzzing method;

carry out fuzzing tests on the predefined program code, based on various fuzzing methods, in order to ascertain in each case one or multiple performance metrics, select one or multiple fuzzing methods corresponding to the associated performance metrics, as a function of the reference performance metric; and carry out fuzzing testing corresponding to the one or multiple selected fuzzing methods.

BRIEF DESCRIPTION OF THE DRAWINGS

Specific embodiments are explained in greater detail below with reference to the appended drawings.

DETAILED DESCRIPTION OF EXAMPLE EMBODIMENTS

Figure 1:
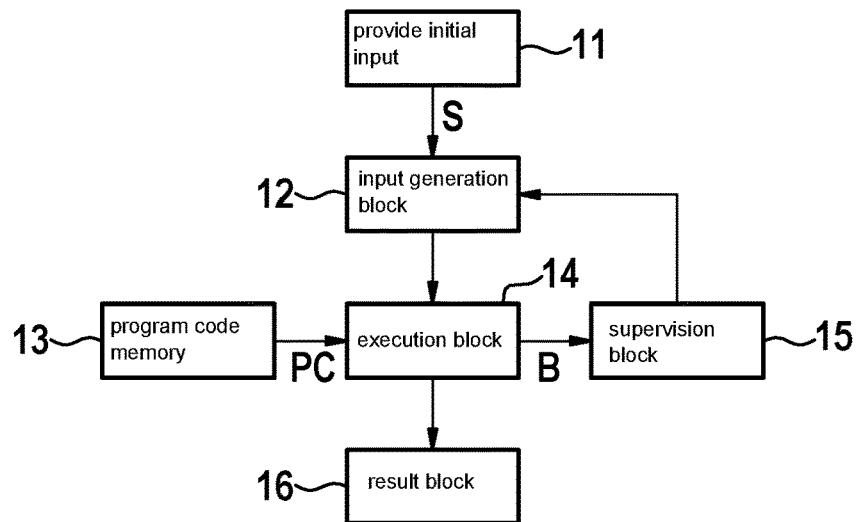
FIG. 1 shows a block diagram for illustrating the carrying out of a fuzzing test, in accordance with an example embodiment of the present invention.

FIG. 1 shows a schematic illustration of the sequence of a test method for a program code.

The method provides for testing the program sequence of a program code with regard to unexpected program abortions. For this purpose, inputs are generated which are to be enhanced as a function of program sequence observations.

An initial input S (input seed/initial corpus) is first provided in block 11 of the block diagram. An input sequence E, which may correspond to the initial input or may be based on a result of a preceding program execution within the scope of the fuzzing test, is generated from the initial input in input generation block 12.

A test method for a program code PC that is retrievable from a program code memory 13 is subsequently carried out in an execution block 14. The test method may be a fuzzing test method, or also a program code analytical method such as symbolic execution. Program code PC is executed, and the execution is appropriately supervised.

The program execution based on input sequence E is analyzed, and corresponding program sequence observations B are collected in a supervision block 15. Supervision block 15 transmits program sequence observations B to input generation block 12 in order to generate a further input sequence.

During the repeated execution of program code PC, using various input sequences E, within the scope of fuzzing testing the program sequence is supervised for program abortions and proper execution of the program and collected in a result block 16.

The applied test method may be one of many fuzzing test methods, which differ in the fuzzing methods. Among the fuzzing test methods, numerous fuzzing methods are available, which differ primarily by the use of the fuzzing software tools and by the initially provided initial inputs (seeds). A fuzzing method may also be characterized by the dictionary used, as well as fuzzing test parameters such as a limitation of the available memory, a setting of a time-out for each test case, a mode or a selection of heuristics of the fuzzing tool, a use of a grammar, and the like, and a testing period of the fuzzing test, the data processing platform on which the fuzzing software tool is operated, as well as the configuration thereof.

Figure 2:
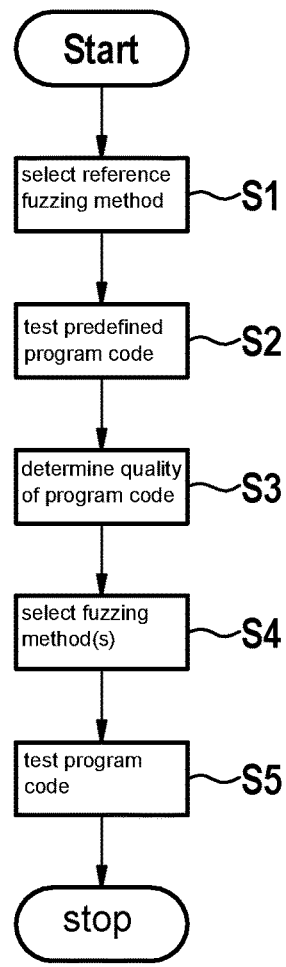
FIG. 2 shows a flowchart for illustrating a method for selecting one or multiple fuzzing methods with the aid of a comparison of performance metrics, in accordance with an example embodiment of the present invention.

FIG. 2 illustrates, based on a flowchart, the sequence of the method for determining a suitable fuzzing method by comparing fuzzing test methods.

A reference fuzzing method is selected in step S1. The reference fuzzing method is a reference based on the result of a fuzzing test that is associated with the selected reference fuzzing method. The reference results are provided as reference performance metrics, and allow a comparison of the reference fuzzing method to other fuzzing methods.

The test using the reference fuzzing method corresponds to a "gold standard" run which by definition is situated in a valid value range. The reference fuzzing test is thus carried out using a predefined fuzzing software tool, including a seed file which as a standard case is representative of possible inputs into program code PC.

Performance metrics are available for the comparison to other fuzzing methods, and may include the following metrics:
- an assessment of the program output according to a predefined output function which assesses, for example, the correctness or validity of a statement;
- an assessment of the behavior for a program abortion, such as a segmentation fault, use-after-free, buffer overflow, etc., according to a predefined abortion function which assesses, for example, the type of behavior for the program abortion;
- an assessment of a decision history, including an assessment of the program sequence paths that are run through, an assessment of the sequence of the branching decisions, an assessment of the control flow, and the like, in order to indicate how well a fuzzing method covers a program code;
- an assessment of the test coverage, for example with regard to program lines executed in a test run, program functions executed in a test run, and program sequence paths executed in a test run, in particular a functional coverage,
- an assessment of the number of executed program sequence paths executed in a test run, the number of different errors that are found in a test run, and/or the average fuzzing execution time;
- an assessment of the test costs, including an execution time or the number of instructions, a memory utilization (with regard to size or memory location), a measure of a register utilization;
- a patch distance, encompassing the distance between two software code versions (two patch versions), a patch corresponding to a region in the program code that has been updated, so that the fuzzing testing attempts to reach this new program position.

The result of the reference fuzzing testing thus corresponds to the one or multiple reference performance metrics that are ascertained for the reference fuzzing method.

One or multiple selected fuzzing test methods corresponding to a particular fuzzing method are used in step S2 in order to test the predefined program code. The fuzzing methods are selected differently. The fuzzing test method may include a source code fuzzing test or a program code analytical method, for example. The fuzzing methods differ with regard to at least one of the criteria: the fuzzing software tool, the test parameters, the seed file, the dictionary, the configuration parameters of the fuzzing software tool in question, and the like.

The fuzzing test methods carried out are assessed based on that/those performance metric(s) that has/have also been ascertained during the fuzzing testing, based on the reference fuzzing method.

The performance metrics are ascertained using a small number of program executions of the provided program code, which is limited by the predefined testing period, for example. For comparability, the numbers of the particular program executions or the selected testing period and the test hardware for determining the reference performance metric and determining the performance metrics to be compared thereto are preferably identical.

Quantitative performance metric differences between the reference performance metrics and the corresponding performance metrics of each of the fuzzing methods are ascertained in step S3 in order to determine the quality of the program code relative to the result of the reference fuzzing method. For each performance metric considered, a performance metric difference results, which may be evaluated for selecting one of the fuzzing methods.

One or multiple fuzzing methods that are suitable for the program code in question may be selected in step S4 as a function of the performance metric differences.

Multiple performance metrics are assessed according to a predefined assessment function, for example by adding the individual performance metric differences in a weighted manner.

In addition, the fuzzing methods may be varied according to an optimization method in order to maximize (or minimize) the evaluated performance metric differences in order to provide the greatest possible distance from the reference performance metric.

When a fuzzing software tool attempts to maximize the coverage, optimal consistency is achieved when it simultaneously also maximizes the execution time. If the performance metrics do not correlate, a weighting of the performance metrics may be introduced to determine which metric is more important than another.

The program code is now thoroughly tested in step S5 with the aid of the selected fuzzing methods.

In a software-in-the-loop environment, for example, performance metrics of the emulators (for example, memory consumption or register occupation) may also be used as performance metrics in question.

In a system environment, for example, performance metrics of the communication (for example, message frequency or importance of a message) may also be used as performance metrics in question.

The method may also be advantageously applied for regression testing, a program function of a program code to be tested being made separately testable with the aid of a test wrapper.

What is claimed is:

1. A computer-implemented method for selecting a fuzzing method for carrying out fuzzing testing of a predefined program code of a program, comprising the following steps:
   providing one or multiple reference performance metrics that characterize a result of reference fuzzing testing of the program code to be tested using a predefined reference fuzzing method;
   carrying out fuzzing tests, based on various fuzzing methods, on the predefined program code to ascertain for each an associated one or multiple performance metrics;
   selecting one or multiple fuzzing methods corresponding to the associated one or multiple performance metrics, as a function of the one or multiple reference performance metrics; and
   carrying out fuzzing testing corresponding to the selected one or multiple fuzzing methods.

2. The method as recited in claim 1, wherein the fuzzing methods are each characterized by the fuzzing software tool used by the fuzzing method, including: seed data used and/or a dictionary used, and/or one or multiple of the following fuzzing test parameters or fuzzing software tool configurations: a limitation of available memory, a setting of a time-out for each test case, a mode or a selection of heuristics of the fuzzing software tool, a use of a grammar, a testing period of the fuzzing test, and at least one property of a data processing platform on which the fuzzing software tool is operated, configurations of the fuzzing software tool.

3. The method as recited in claim 1, wherein the one or more performance metrics characterizes the program code based on statistical features, and includes or is a function of one or multiple of the following variables:

an assessment of output of the program;
an assessment of a behavior during a program abortion;
an assessment of a decision history, including an assessment of program sequence paths that are run through, an assessment of the sequence of branching decisions, and an assessment of control flow;
an assessment of overage of the fuzzing test with regard to program lines, program functions, and program sequence paths, including a functional coverage, a number of executed program sequence paths, a number of different errors that are found, and tan average fuzzing execution time;
an assessment of costs of the fuzzing test, including an execution time or a number of instructions, a memory utilization, a measure of a register utilization;
a patch distance encompassing a distance between two program code versions.

4. The method as recited in claim 1, wherein one or multiple performance metric differences between the one or multiple reference performance metrics and the one or multiple associated performance metrics of the various fuzzing test methods are determined, and those of the various fuzzing methods being selected for which its performance metric difference, and/or a measure that results from the performance metric differences according to an assessment function, is at a maximum or minimum.

5. The method as recited in claim 1, wherein the fuzzing tests are carried out on the predefined program code, based on the various fuzzing methods, for ascertaining the one or more performance metrics, each with an execution duration between one minute and three hours, and/or a computing time that is less than an execution duration of a conventional fuzzing testing, using the selected one or multiple fuzzing methods.

6. The method as recited in claim 1, wherein the program code corresponds to a function of a provided program code that is separated by a test wrapper.

7. A device comprising:
a computer, wherein the computer configured to:
provide one or multiple reference performance metrics that characterize a result of reference fuzzing testing of a predefined program code to be tested using a predefined reference fuzzing method;
carry out fuzzing tests on the predefined program code, based on various fuzzing methods, in order to ascertain for each one or multiple associated performance metrics;
select one or multiple fuzzing methods corresponding to the one or multiple associated performance metrics, as a function of the reference performance metric; and
carry out fuzzing testing corresponding to the selected one or multiple fuzzing methods.

8. A non-transitory machine-readable memory medium on which is stored a computer program for selecting a fuzzing method for carrying out fuzzing testing of a predefined program code of a program, the computer program, when executed by a data processing device, causing the data processing device to perform the following steps:
providing one or multiple reference performance metrics that characterize a result of reference fuzzing testing of the program code to be tested using a predefined reference fuzzing method;
carrying out fuzzing tests, based on various fuzzing methods, on the predefined program code to ascertain for each an associated one or multiple performance metrics;
selecting one or multiple fuzzing methods corresponding to the associated one or multiple performance metrics, as a function of the one or multiple reference performance metrics; and
carrying out fuzzing testing corresponding to the selected one or multiple fuzzing methods.

* * * * *